US011372656B2

(12) United States Patent
Corbin

(10) Patent No.: US 11,372,656 B2
(45) Date of Patent: Jun. 28, 2022

(54) DISPLAYING DATA RELATED TO MEDIA CONTENT

(71) Applicant: Sonos, Inc., Santa Barbara, CA (US)

(72) Inventor: Keith Corbin, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 17/135,299

(22) Filed: Dec. 28, 2020

(65) Prior Publication Data

US 2021/0373918 A1 Dec. 2, 2021

Related U.S. Application Data

(63) Continuation of application No. 16/011,233, filed on Jun. 18, 2018, now Pat. No. 10,877,779, which is a
(Continued)

(51) Int. Cl.
| | |
|---|---|
| *G06F 9/451* | (2018.01) |
| *H04N 21/431* | (2011.01) |
| *H04N 21/462* | (2011.01) |
| *H04N 21/482* | (2011.01) |
| *G06F 16/904* | (2019.01) |
| *G06F 16/64* | (2019.01) |
| *G06F 40/186* | (2020.01) |
| *G06F 40/174* | (2020.01) |

(52) U.S. Cl.
CPC .............. *G06F 9/451* (2018.02); *G06F 16/64* (2019.01); *G06F 16/904* (2019.01); *G06F 40/174* (2020.01); *G06F 40/186* (2020.01); *H04N 21/4314* (2013.01); *H04N 21/4316* (2013.01); *H04N 21/4622* (2013.01); *H04N 21/482* (2013.01)

(58) Field of Classification Search
CPC ...... G06F 9/451; G06F 40/174; G06F 40/186; G06F 16/64; G06F 16/904; H04N 21/4314; H04N 21/4622; H04N 21/482; H04N 21/4316
See application file for complete search history.

(56) References Cited

U.S. PATENT DOCUMENTS 8,291,349 B1 * 10/2012 Park ..................... G06F 3/04883
715/705
8,325,367 B2 * 12/2012 Gaucas ................. G06F 3/1257
715/251
(Continued)

OTHER PUBLICATIONS

Microsoft Press, Microsoft Computer Dictionary 522 (5th ed. 2002). (Year: 2002).*

(Continued)

*Primary Examiner* — Justin R. Blaufeld
(74) *Attorney, Agent, or Firm* — Fortem IP LLP; Benjamin Urban

(57) ABSTRACT

Examples described herein may include a computing device of a media playback system receiving a display map corresponding to a media service provider. The display map may associate a data field with a location within a display of the computing device. The computing device may further receive a data item associated with a media item of the media service provider. The received data item may correspond to the data field. The computing device may display an indication of the received data item at the location in accordance with the display map.

20 Claims, 7 Drawing Sheets

Related U.S. Application Data continuation of application No. 14/502,736, filed on Sep. 30, 2014, now Pat. No. 10,002,005.

(56) References Cited

U.S. PATENT DOCUMENTS

| | | | |
|---|---|---|---|
| 9,426,529 B2* | 8/2016 | Lee | H04N 21/4788 |
| 10,002,005 B2* | 6/2018 | Corbin | H04N 21/43615 |
| 2002/0103817 A1* | 8/2002 | Novak | G06F 9/451 |
| 2002/0107973 A1* | 8/2002 | Lennon | G11B 27/105 |
| | | | 725/105 |
| 2002/0138593 A1* | 9/2002 | Novak | H04L 65/607 |
| | | | 709/219 |
| 2002/0143822 A1* | 10/2002 | Brid | G06F 16/9577 |
| 2003/0110297 A1* | 6/2003 | Tabatabai | H04N 21/25833 |
| | | | 707/E17.121 |
| 2003/0167250 A1* | 9/2003 | Sash | G06F 16/9535 |
| 2004/0187079 A1* | 9/2004 | Yamada | G06F 40/103 |
| | | | 715/246 |
| 2005/0044499 A1* | 2/2005 | Allen | G11B 27/034 |
| | | | 715/704 |
| 2005/0268227 A1* | 12/2005 | Carlson | G06F 40/186 |
| | | | 715/223 |
| 2006/0150088 A1* | 7/2006 | Kraft | G06F 40/186 |
| | | | 715/253 |
| 2007/0038999 A1* | 2/2007 | Millington | H04N 21/4307 |
| | | | 718/100 |
| 2007/0186230 A1* | 8/2007 | Foroutan | G06Q 30/0212 |
| | | | 463/40 |
| 2007/0255811 A1* | 11/2007 | Pettit | G06F 16/9577 |
| | | | 707/E17.121 |
| 2008/0104617 A1* | 5/2008 | Apacible | G16H 10/60 |
| | | | 719/328 |
| 2008/0294777 A1* | 11/2008 | Karve | G06F 8/60 |
| | | | 709/226 |
| 2009/0031255 A1* | 1/2009 | Kidd | H04N 21/84 |
| | | | 715/845 |
| 2009/0031338 A1* | 1/2009 | Sharkey | H04N 21/8153 |
| | | | 725/32 |
| 2009/0125812 A1* | 5/2009 | Blinnikka | G06F 16/4393 |
| | | | 715/716 |
| 2009/0144640 A1* | 6/2009 | Schneider | G06F 16/9577 |
| | | | 715/760 |
| 2009/0177968 A1* | 7/2009 | Volk | G06F 3/0484 |
| | | | 707/999.107 |
| 2010/0169755 A1* | 7/2010 | Zafar | G06Q 10/00 |
| | | | 715/205 |
| 2010/0325591 A1* | 12/2010 | Lippincott | G06F 30/392 |
| | | | 716/54 |
| 2010/0328725 A1* | 12/2010 | Gaucas | G06F 3/1243 |
| | | | 358/1.18 |
| 2011/0218983 A1* | 9/2011 | Chaney | G06F 16/686 |
| | | | 707/705 |
| 2012/0246573 A1* | 9/2012 | Arokiaswamy | G06F 40/166 |
| | | | 715/748 |
| 2013/0174021 A1* | 7/2013 | Buchwald | G06F 40/154 |
| | | | 715/235 |
| 2013/0191749 A1* | 7/2013 | Coburn, IV | G11B 27/105 |
| | | | 715/716 |
| 2013/0254207 A1* | 9/2013 | Coburn, IV | G06F 3/165 |
| | | | 707/740 |
| 2014/0181656 A1* | 6/2014 | Kumar | H04L 12/6418 |
| | | | 715/716 |
| 2014/0281892 A1* | 9/2014 | Baldwin | G06F 40/143 |
| | | | 715/234 |
| 2014/0281928 A1* | 9/2014 | Tkach | G06F 40/186 |
| | | | 715/243 |
| 2014/0282138 A1* | 9/2014 | Hopton | G06F 9/451 |
| | | | 715/765 |
| 2014/0325374 A1* | 10/2014 | Dabrowski | G06F 9/451 |
| | | | 715/744 |
| 2014/0365876 A1* | 12/2014 | J | G06Q 30/0242 |
| | | | 715/253 |
| 2015/0143210 A1* | 5/2015 | Lam | G06F 16/4393 |
| | | | 715/202 |
| 2015/0248216 A1* | 9/2015 | Li | G06F 16/9535 |
| | | | 715/745 |

OTHER PUBLICATIONS

Larry Flick, 'All That You Can't Leave Behind': The Songs (Billboard, Oct. 7, 2000) (Year: 2000).*

* cited by examiner

DISPLAYING DATA RELATED TO MEDIA CONTENT

CROSS REFERENCE TO RELATED APPLICATIONS

This application claims priority under 35 U.S.C. § 120 to, and is a continuation of, U.S. non-provisional Patent Application Ser. No. 16/011,233, filed on Jun. 18, 2018, entitled "Displaying Data Related to Media Content," which is incorporated herein by reference in its entirety.

U.S. non-provisional patent application Ser. No. 16/011,233 claims priority under 35 U.S.C. § 120 to, and is a continuation of, U.S. non-provisional patent application Ser. No. 14/502,736, filed on Sep. 30, 2014, entitled "Displaying Data Related to Media Content," and issued as U.S. Pat. No. 10,002,005 on Jun. 19, 2018, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
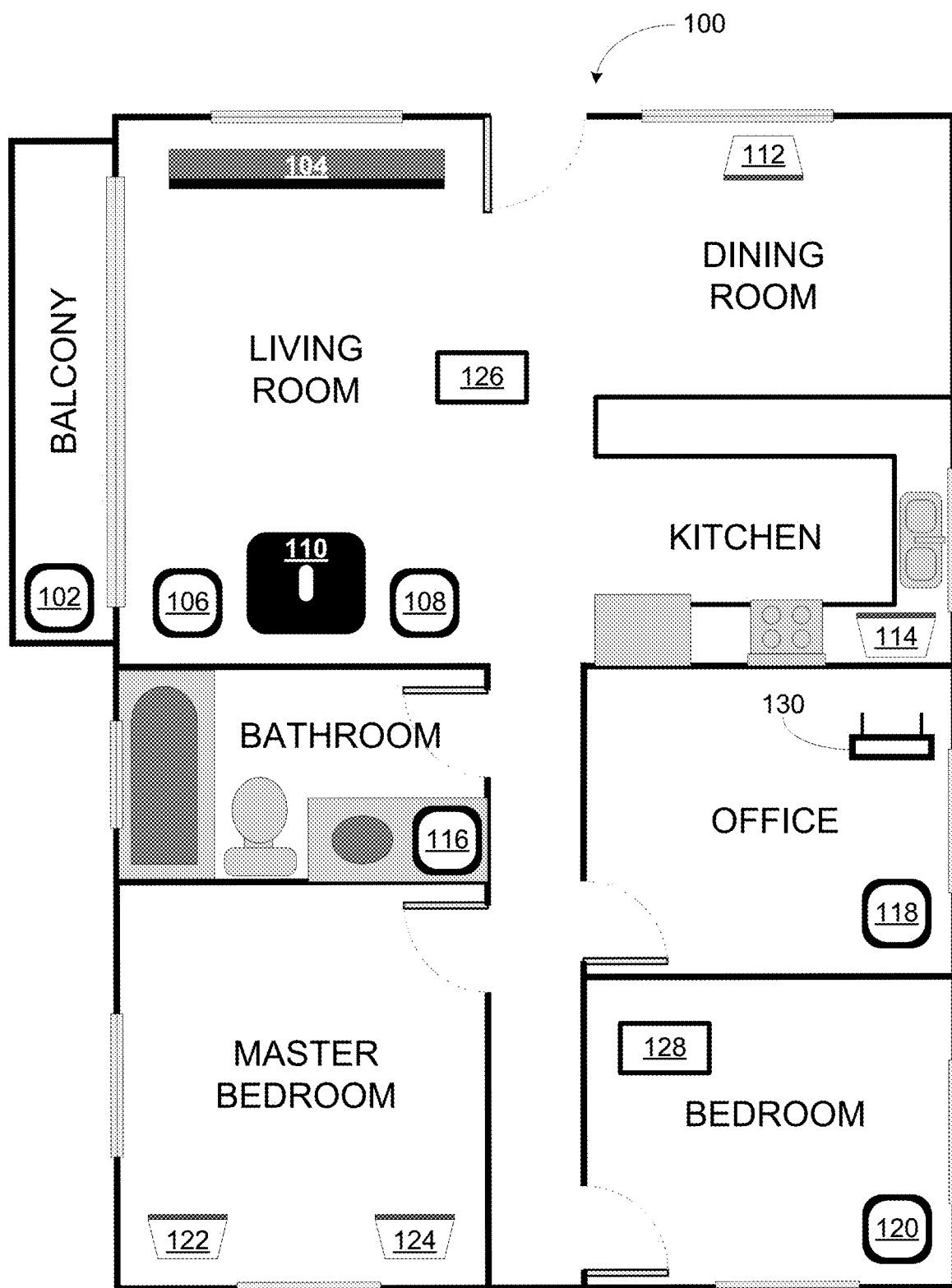
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In examples herein, a media playback system may at times display information related to media items according to a first display map (perhaps a default display map). The first display map may designate locations on a display where particular information is displayed. The first display map may be particular to a given media playback system. As such, when the media playback system receives information related to media items provided by a media service provider, the media playback system may display the information in an undesirable manner, if at all, because the received information does not comport with the first display map in some way.

To help avoid such a situation, the media playback system may receive from a media service provider a second display map that is particular to the media service provider. When the media playback system subsequently receives from the media service provider media items and corresponding information about those media items, the media playback system may display the information in accordance with the second display map. In this way, the media playback system may adapt its display based on the particular media service provider that is providing media and information.

In particular, a media playback system may receive one or more media items from a media service provider. The media playback system may also store or receive data items that are associated with one or more of the media items. Such data items may be stored or received in a format such that the data items are associated with respective data fields, such as "track title," "artist," or "album title," for example.

A computing device of the media playback system may include a display configured to display indications of the data items. The computing device may store, receive, or otherwise have access to a first display map that associates the data fields with respective locations within the display. For example, the display may include first and second rows for displaying indications of data items, and the first display map may associate a first data field (e.g., "track title") with the first row and a second data field (e.g., "artist") with the second row. In this way, the computing device may display indications of data items at locations that are associated, by the first display map, with respective data fields associated with the data items.

At some later time, the media playback system may receive, from a media service provider (possibly a second media service provider), one or more media items and associated data items. These data items may be provided in a manner that does not comport with the first display map. For example, the media service provider may provide the data items such that the first line of the display is intended to indicate an album title and the second line of the display is intended to indicate a track title and an artist name. Recall from the previous example, the first display map may associate a "track title" data field with the first line of the display and an "artist" data field with the second line of the display. In this example, the data items are received such that the data items (e.g., the album title and the track title and artist name) conflict with the data fields "track title" and "artist", respectively. Accordingly, the display may display an error message due to the first display map and the received data items being incongruent.

Instead of causing an error message for instance, in examples described herein, a media service provider may provide the data items to the computing device in a manner that manipulates an otherwise incongruent display map to yield an intended display. For instance, the data items may be received such that an album title is associated with the data field "track title" so that the first display map will associate the album title with the first line of the display. However, if a media item associated with the data items is stored within a database of the media playback system, the media item may be difficult to locate within the database because the media item may be associated with a track title that is actually an album title.

Accordingly, it may be useful for the computing device to utilize display maps that respectively correspond with various media service providers and/or various display formats to display, as intended, indications of data items associated with media items. For example, the computing device may receive additional data indicating that the received data items correspond to a given display map, and then display indications of the received data items at respective indications according to the given display map.

In one aspect, a method includes receiving, by a computing device of a media playback system, a display map corresponding to a media service provider, where the display map associates a data field with a location within a display of the computing device; receiving, by the computing device, a data item associated with a media item of the media service provider, where the received data item corresponds to the data field; and displaying, by the display, an indication of the received data item at the location in accordance with the display map.

In another aspect, a non-transitory computer-readable medium stores instructions that when executed by a computing device of a media playback system, cause the computing device to perform functions. The functions include receiving a display map corresponding to a media service provider, where the display map associates a data field with a location within a display of the computing device; receiving a data item associated with a media item of the media service provider, where the received data item corresponds to the data field; and displaying, by the display, an indication of the received data item at the location in accordance with the display map.

In yet another aspect, a computing device of a media playback system includes a processor; a display; and a computer-readable medium storing instructions that when executed by the processor cause the computing device to perform functions. The functions include receiving a display map corresponding to a media service provider, where the display map associates a data field with a location within the display; receiving a data item associated with a media item of the media service provider, where the received data item corresponds to the data field; and displaying, by the display, an indication of the received data item at the location in accordance with the display map.

In yet another aspect, a method includes sending, by a computing system associated with a media service provider, a display map that associates one or more data fields with a respective location within a display of a computing device; and sending, by the computing system, one or more data items associated with one or more media items of the media service provider, where each sent data item corresponds to a respective at least one of the one or more data fields.

In yet another aspect, a non-transitory computer-readable medium stores instructions that when executed by a computing system associated with a media service provider cause the computing system to perform functions. The functions include sending a display map that associates one or more data fields with a respective location within a display of a computing device; and sending one or more data items associated with one or more media items of the media service provider, where each sent data item corresponds to a respective at least one of the one or more data fields.

In yet another aspect, a computing system associated with a media service provider includes a processor and a computer-readable medium storing instructions that when executed by the processor cause the computing system to perform functions. The functions include sending a display map that associates one or more data fields with a respective location within a display of a computing device; and sending one or more data items associated with one or more media items of the media service provider, where each sent data item corresponds to a respective at least one of the one or more data fields.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
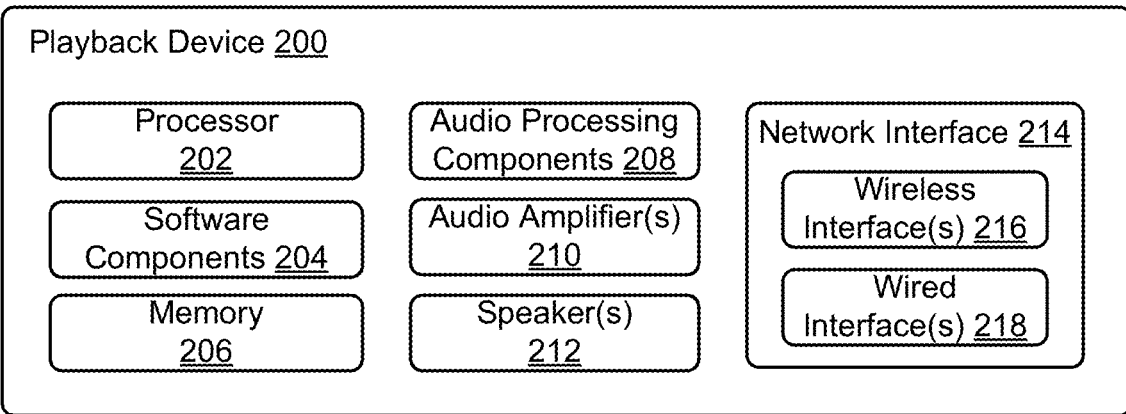
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
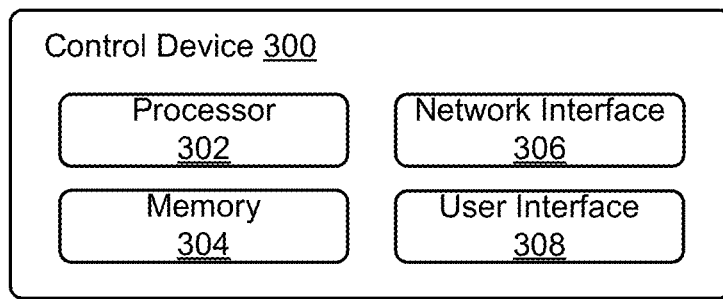
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
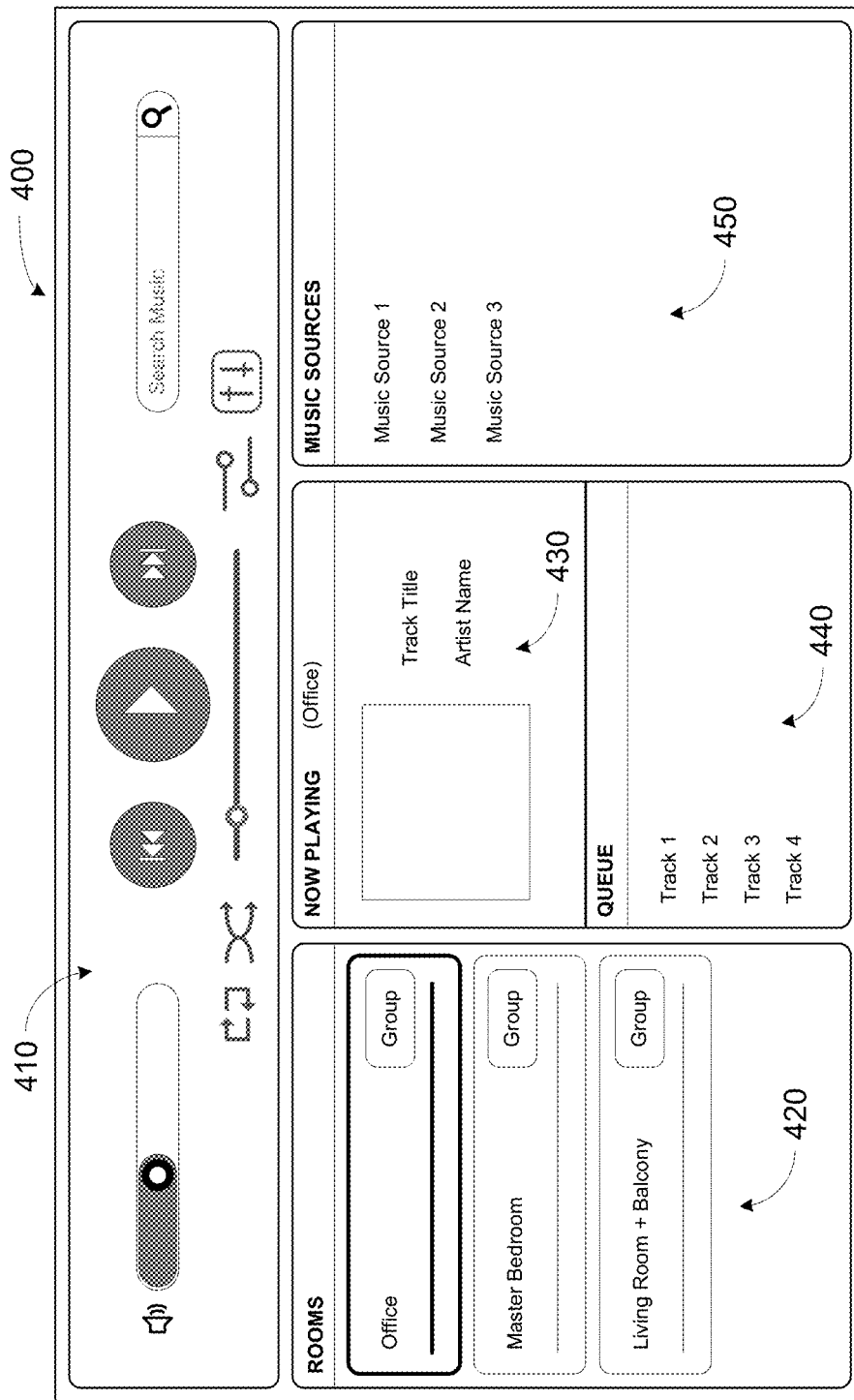
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the representations of playback zones. The "group" icon provided within a representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include representations of audio content that is presently being played, previously played, or scheduled to play next in the selected playback zone or zone group. The selected playback zone or zone group may be visually distinguished on the user interface, such as within the playback zone region 420 and/or the playback status region 430. The representations may include track title, artist name, album name, album year, track length, and other relevant information that may be useful for the user to know when controlling the media playback system via the user interface 400.

The playback queue region 440 may include representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the representations of audio content in the playback queue region 440 may include track titles, artist names, track lengths, and other relevant information associated with the audio content in the playback queue. In one example, representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Methods and Systems for Displaying Data Related to Media Content

Figure 5:
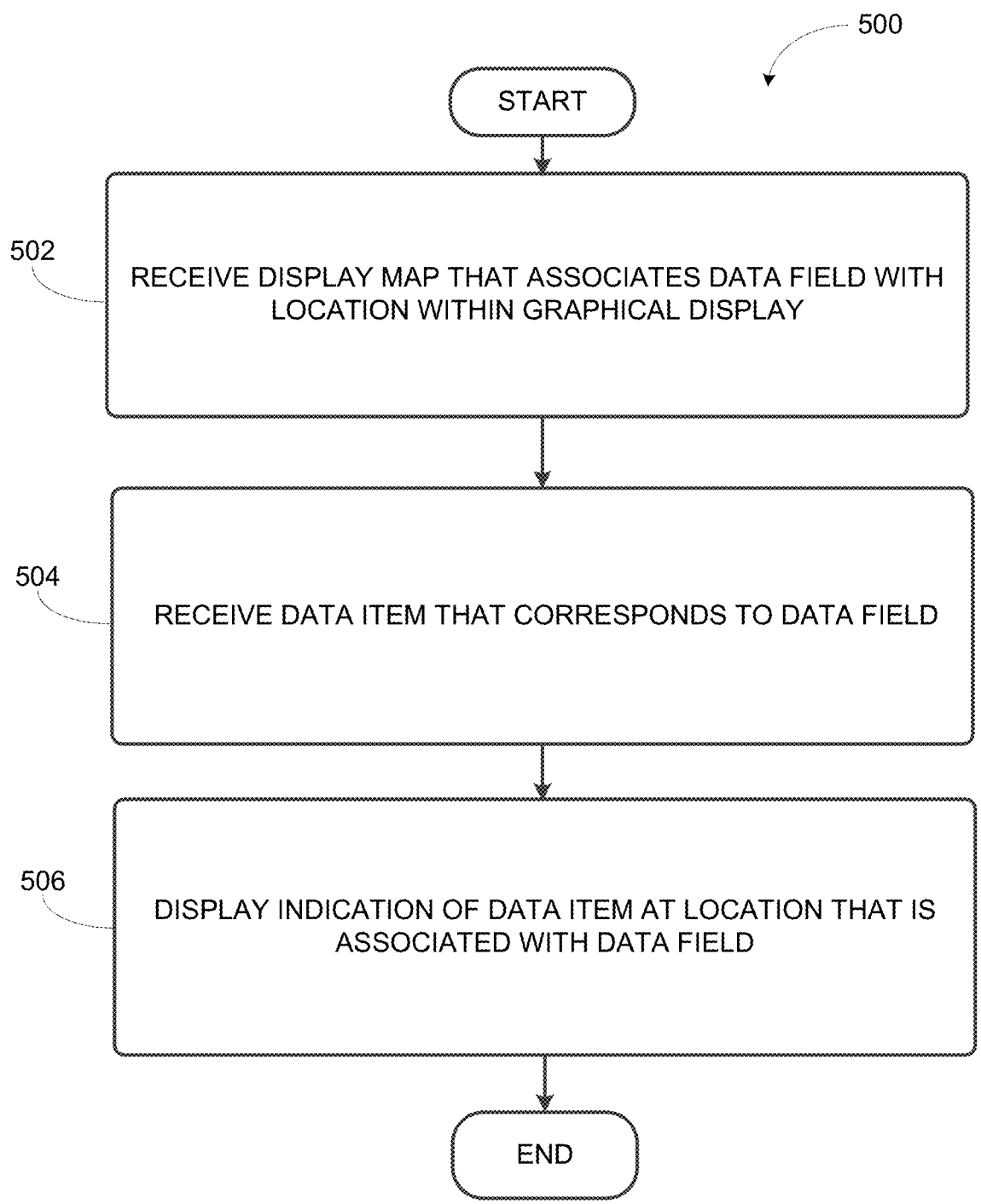
FIG. 5 shows an example flow diagram of an example method.
Figure 6:
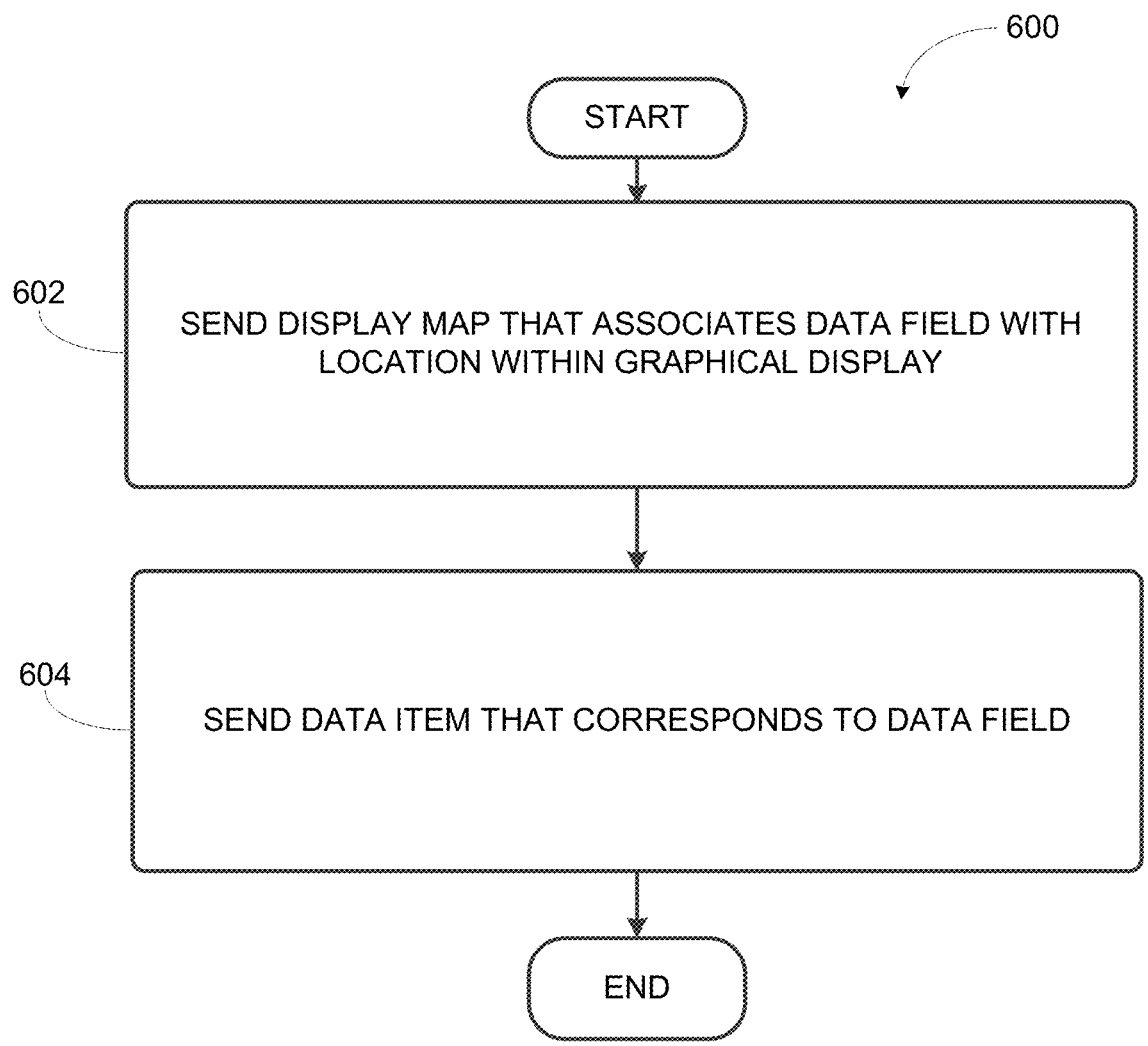
FIG. 6 shows an example flow diagram of an example method.

Referring now to FIGS. 5 and 6, methods 500 and 600 present example methods that may be implemented within an operating environment involving, for example, one or more instances of the media playback system 100 of FIG. 1, one or more of the playback device 200 of FIG. 2, and/or one or more of the control device 300 of FIG. 3. Methods 500 and 600 may include one or more operations, functions, or actions as illustrated by one or more of blocks 502-506 and 602-604. For clarity, the methods 500 and 600 may be described herein with reference to FIGS. 7-10. It should be understood, however, that this is for purposes of example and explanation only and that the operations of the methods should not be construed as limited by these figures.

In addition, for the methods 500 and 600 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the methods 500 and 600 and other processes and methods disclosed herein, each block shown in the FIGS. 5 and 6 may represent circuitry that is wired to perform the specific logical functions in the process. Moreover, although the blocks are illustrated in sequential order, these blocks may also be performed in parallel, and/or in a different order than those described herein. Also, the various blocks may be combined into fewer blocks, divided into additional blocks, and/or removed based upon the desired implementation.

Referring to FIG. 5, at block 502 the method 500 involves receiving, by a computing device of a media playback system, a display map corresponding to a media service provider. The display map may associate one or more data fields with a respective location within a display of the computing device. Referring to FIG. 1 as an example, the computing device may be a control device, such as the control device 126. In another example, the computing device may be a playback device, such as the playback device 110.

The one or more data fields may represent various categories by which one or more media items provided by the media service provider may be characterized. As examples, the one or more data fields may correspond to at least one of (i) a track title of the one or more media items, (ii) an album title associated with the one or more media items, (iii) a playlist title associated with the one or more media items, (iv) imagery associated with the one or more media items, (v) a name of a composing entity (e.g., artist) associated with the one or more media items, (vi) a name of a performing entity (e.g., artist) associated with the one or more media items, and (vii) a title of an Internet radio stream associated with the one or more media items. Other such examples may exist.

Figure 7:
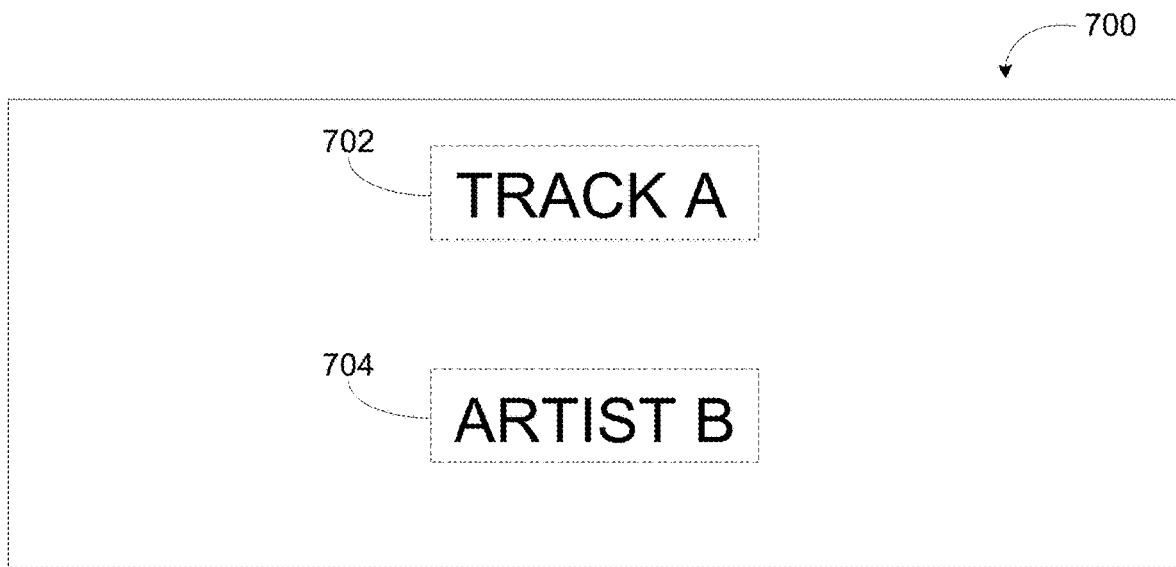
FIG. 7 shows an example display.

The display map may include data that indicates associations between the one or more data fields and the respective locations within the display. For example, the data may include a table that assigns a given data field to a given location within the display. The display map may be received from a computing system associated with the media service provider, perhaps via a wide-area network (WAN). Alternatively, the display map may be received from another computing device (e.g., a playback device) of the media playback system (e.g., via a local area network (LAN)). Referring to FIG. 7 as an example, the display map may associate a first data field (e.g., "track title") with a first location 702 within a display 700 and may associate a second data field (e.g., "artist") with a second location 704 within the display 700. Although FIG. 7 depicts the first location 702 (e.g., a first row) as being located above the second location 704 (e.g., a second row), other examples are contemplated herein.

The display map may be received by the computing device in response to the computing device detecting an input representing a command to request the one or more media items from the media service provider (perhaps for playback). For example, the input may represent a command to initiate playback of a playlist, and in response to the input, the computing device may request the one or more media items identified by the playlist and the display map (e.g., corresponding to a playlist) from a computing system associated with the media service provider. (In another example, the display map may be received with the media items without being explicitly requested by the computing device.) The computing system associated with the media service provider may then send the media items and the display map to the computing device.

The display map may take various forms and/or be provided by a media service provider in various ways. For example, portions of the display map may be received incrementally by the computing device such that indications of display locations for each data field and corresponding data item is received with each media item. That is, the display map need not be one contiguous file, but may include data received intermittently over time, perhaps as various media items are received (e.g., as metadata associated with the media item).

In other examples, the display map may be received as a contiguous data file (e.g., when the computing device performs a registration procedure with the media service provider and/or when the computing device downloads and installs a media playback application associated with the media service provider.) The computing device may also receive periodic updates to the display map from the media service provider. In one example, multiple display maps may be received by the computing device for later use (e.g., the display map may be stored within memory of the computing device or within another memory device accessible to the computing device).

The display map may be received by the computing device in response to the computing device determining that a given media item corresponds to the media service provider and sending a request for a display map to a computing system associated with the media service provider. In some examples, the received display map may include data indicating intended display locations for respective data items associated with a single media item (e.g. on media item by media item basis), while in other examples the display map may include data indicating display locations pertaining to data fields and corresponding data items associated with any media item provided by the media service provider.

Display maps may be stored by the computing device (e.g., a control device or a playback device) to be accessed at a later time. Accordingly, the display map need not be provided contemporaneously with the media item or the data item corresponding to the media item. In some examples, the computing device may first receive a data location (e.g., a URL) pertaining to a storage location of the display map and may receive the display map at a later time by requesting the display map from the URL when the computing device displays an indication of a data item.

At block 504, the method 500 involves receiving, by the computing device, one or more data items associated with one or more media items of the media service provider. Each received data item corresponds to a respective at least one of the one or more data fields. The one or more data items may be received from a computing system associated with the media service provider (e.g., a server of the media service provider), perhaps via a wide-area network (WAN). Alternatively, the one or more data items may be received from another computing device of the media playback system (e.g., via a local area network (LAN)). The one or more data items may include data such as "TRACK A" (e.g., corresponding to a data field "track title"), "ARTIST B" (e.g., corresponding to a data field "artist"), "ALBUM C" (e.g., corresponding to a data field "album"), "Playlist X" (e.g., corresponding to a data field "playlist title"), an image (e.g., corresponding to a data field "image"), or "Radio Stream N" (e.g., corresponding to a data field "radio stream title").

At block 506, the method 500 involves displaying, by the display, an indication of each received data item at the location that is associated, by the display map, with the respective at least one data field that corresponds to each received data item. Referring to FIG. 7 as an example, the display map may associate a data field "track title" with the location 702 within the display 700, and the display 700 of the computing device may display an indication "TRACK A" at the location 702. Also, the display map may associate the data field "artist" with the location 704, and the display 700 may display an indication "ARTIST B" at the location 704. The display map may include information such as pixel location within the display (e.g. indicated with horizontal and or vertical grid location formats.) The display map may also include information such as color, font, animation, text-wrapping. For example, the display map may indicate that a text string corresponding to album title is displayed in green text whereas a text string corresponding to a track title is displayed in black text. Various data fields may have different font styles assigned by the display map as well.

In some examples, the display map may indicate that an image or text to be displayed is to be scaled based on the overall size of the display of the computing device. For example, a received image may be cropped and or scaled down to fit a small display whereas the image may be expanded or scaled up to fit a larger display.

Additional operations may be carried out with or in addition to the method 500. It should be understood that the below discussed operations are not necessary to perform the method 500.

Figure 8:
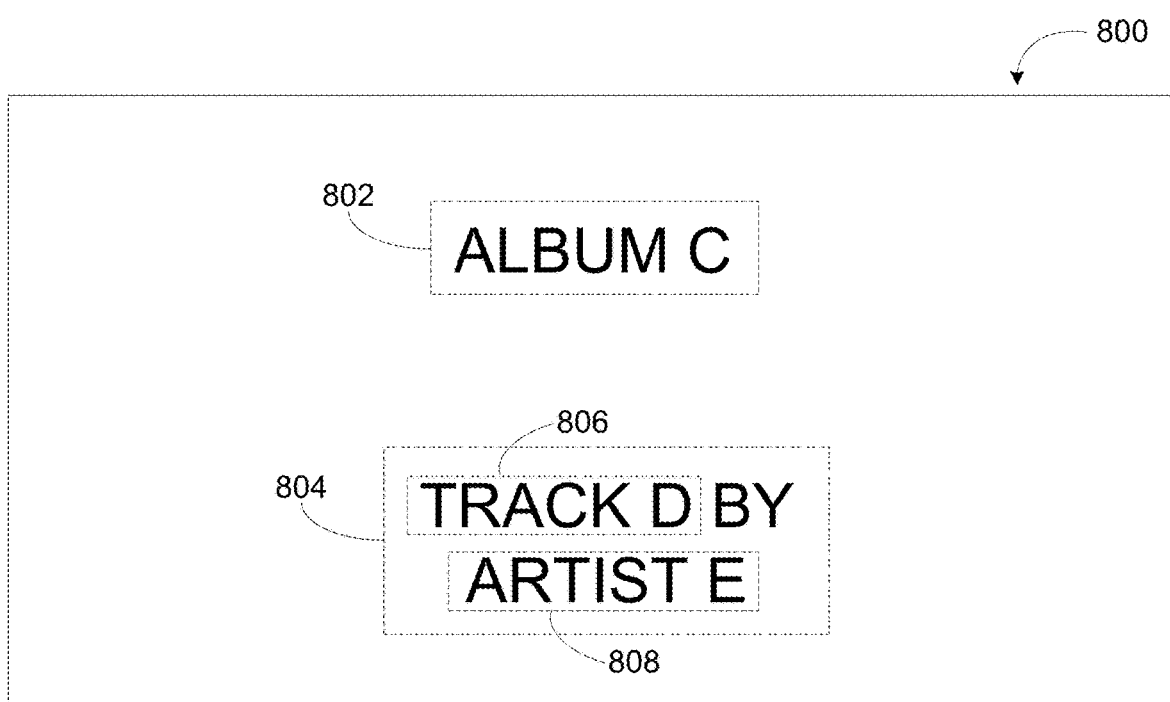
FIG. 8 shows an example display.

In some examples, the display map may further associate a text string template with a template location within the display. Also, the display map may further associate at least one of the one or more data fields with a data field location within the template location. In this context, the method 500 may also include displaying the text string template at the template location, determining that at least one received data item corresponds to the data field location, and displaying the at least one received data item at the data field location. Referring to FIG. 8 as an example, the display map may associate a data field "album" with a location 802 within a display 800, and may associate a text string template "_____BY_____" with a template location 804 within the display 800. The display map may further associate a data field "track title" with a data field location 806 and associate a data field "artist" with a data field location 808. The display 800 may also display respective indications of data items "TRACK D" and "ARTIST E" at the respective data field locations 806 and 808 within the template location 804.

An example of such an operation may involve, before an indication of each received data item is displayed by the display, the computing device determining that each received data item corresponds to the respective at least one data field. Then, the display may display the indication of each received data item based on the determination. In one example, the computing device may make the determination based on receiving additional data indicating that each received data item respectively corresponds to the respective at least one data field. For instance, the additional received data may indicate that the display map corresponds to the received data items, and the computing device may further determine associations between data fields and received data items based on an order in which the data items are received. For example, according to a predetermined protocol, a first received data item may correspond to a data field "artist," a second received data item may correspond to a data field "album," and so on. In another example, the additional received data may include a table that maps data items to respective data fields.

Other additional operations may involve, prior to displaying the indication of each received data item, determining that the received data items correspond to the display map, and based at least in part on the determination, displaying the indication of each received data item at the location that is associated, by the display map, with the respective at least one data field that corresponds to each received data item. For example, the computing device may receive additional data (e.g., along with the received data items) indicating that the received data items correspond to a given display map and determine that the received data items correspond to the given display map based on the received data. By further example, the computing device may determine that the given display map (e.g., for a playlist) corresponds to the received data items based on receiving data indicating that the received data items correspond to a playlist. In a similar manner, the computing device may determine that the given display map (e.g., for an album) corresponds to the received data items based on receiving data indicating that the received data items correspond to an album.

Another additional operation may involve causing, by the computing device, a playback device of the media playback system to initiate playback of at least one of the media items and displaying the indication of each received data item after causing the playback device to initiate playback of the at least one of the media items. Referring to FIG. 7 as an example, the at least one media item may be an audio track "Track A," and the computing device may cause the playback device to initiate playback of the audio track "Track A" before displaying the indications of received data items "TRACK A" at location 702 and "ARTIST B" at location 704. In this example, the data items "TRACK A" and "ARTIST B" may be associated with the audio track "Track A."

Figure 10:
FIG. 10 shows an example display.

In some examples, a displayed indication of a data item may be associated with a media item that includes or represents a collection of media items (e.g., an album or a playlist). In such a case, the computing device may detect input representing a command to display indications of data items corresponding to the collection of media items. In this context, additional operations may include receiving, by the computing device, a second display map corresponding to the media service provider. The second display map may associate a second set of one or more data fields with a second set of respective locations within the display. For instance, the computing device may receive a second display map that respectively associates data fields "first album track," "second album track," "third album track," and "fourth album track" with locations 1002, 1004, 1006, and 1008, as shown in FIG. 10.

Further operations may also include receiving, by the computing device, a second set of one or more data items associated with the collection of media items. The second set of data items may respectfully correspond to at least one data field of the second set of data fields. For example, the computing device may receive a second set of data items "Track D," "Track E," "Track F," and "Track G," along with data indicating that the received second set of data items respectively correspond to data fields "first album track," "second album track," "third album track," and "fourth album track."

Figure 9:
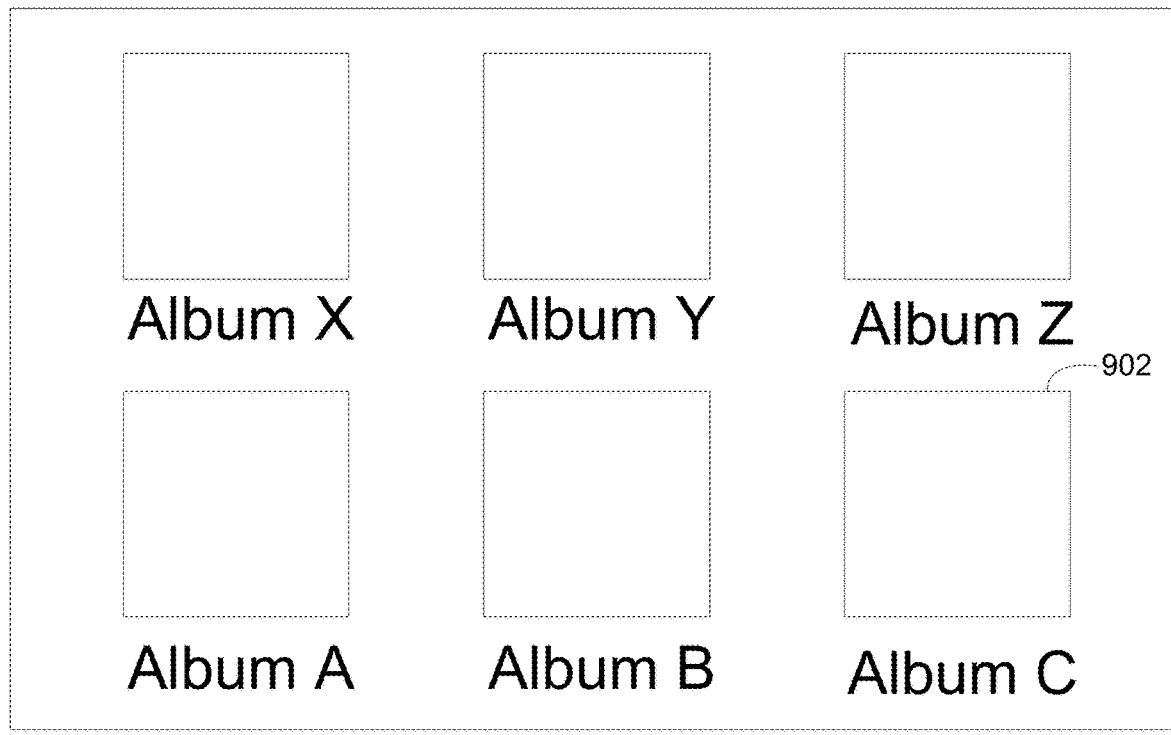
FIG. 9 shows an example display.

Further operations may also include, after displaying the respective indications of the first set of received data items, detecting, by the computing device, a command to display respective indications of the second set of data items (e.g., a command to display a track listing of a playlist). Referring to FIG. 9 as an example, the computing device may then receive an input (e.g., a touch input at location 902) indicating a command to display indications of data items corresponding to "Album C."

Further operations may include, based on the detected command, displaying, by the display, the respective indications of the second set of data items at the respective locations that are associated, by the second display map, with the at least one data field of the second set of data fields. As shown in FIG. 10, the display 1000 may display respective indications of the second set of data items at locations 1002-1008, according to the associations defined by the second display map. In some examples, the computing device may receive (e.g., from the computing system of the media service provider) an indication that the second display map is associated with the collection of media items and may display the respective indications of the second set of data items based, at least in part, on the received indication.

In some examples, the display map is a first display map and the one or more data items are a first set of data items. Additional operations may also include receiving a second set of one or more data items associated with a second set of one or more media items, and displaying respective indications of the second set of data items at a second set of respective locations. The second set of data items may be respectively associated with the second set of respective locations in accordance with a second display map accessible to the computing device. For example, the second display map may be a "default" display map that the computing device uses to determine display locations of received data items when the computing device has determined that no other display map should be used to display the received data items.

An example method may also include operations performed by a computing system of a media service provider in interaction with the computing device described above in relation to the method 500. Referring now to FIG. 6, at block 602 the method 600 may involve sending, by a computing system associated with a media service provider, a display map that associates one or more data fields with a respective location within a display of a computing device. For example, the computing system may be a server or a collection of computing devices that store various media items that may be played back by a media playback system. The display map may be sent to a computing device (e.g., a control device) of a media playback system so that a display of the computing device may display indications of data items associated with the one or more data fields in a predetermined manner. The data fields, data items, and indications of the data items may be similar to data fields, data items, and indications of data items described above in relation to blocks 502-506 of method 500.

At block 604 the method 600 may involve sending, by the computing system, one or more data items associated with one or more media items of the media service provider. Each sent data item may correspond to a respective at least one of the one or more data fields. The data items may be received by the computing device so that the display may display indications of the data items in accordance with the display map.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In one aspect, a method includes receiving, by a computing device of a media playback system, a display map corresponding to a media service provider, where the display map associates a data field with a location within a display of the computing device; receiving, by the computing device, a data item associated with a media item of the media service provider, where the received data item corresponds to the data field; and displaying, by the display, an indication of the received data item at the location in accordance with the display map.

In another aspect, a non-transitory computer-readable medium stores instructions that when executed by a computing device of a media playback system, cause the computing device to perform functions. The functions include receiving a display map corresponding to a media service provider, where the display map associates a data field with a location within a display of the computing device; receiving a data item associated with a media item of the media service provider, where the received data item corresponds to the data field; and displaying, by the display, an indication of the received data item at the location in accordance with the display map.

In yet another aspect, a computing device of a media playback system includes a processor; a display; and a computer-readable medium storing instructions that when executed by the processor cause the computing device to perform functions. The functions include receiving a display map corresponding to a media service provider, where the display map associates a data field with a location within the display; receiving a data item associated with a media item of the media service provider, where the received data item corresponds to the data field; and displaying, by the display, an indication of the received data item at the location in accordance with the display map.

In yet another aspect, a method includes sending, by a computing system associated with a media service provider, a display map that associates one or more data fields with a respective location within a display of a computing device; and sending, by the computing system, one or more data items associated with one or more media items of the media service provider, where each sent data item corresponds to a respective at least one of the one or more data fields.

In yet another aspect, a non-transitory computer-readable medium stores instructions that when executed by a computing system associated with a media service provider cause the computing system to perform functions. The functions include sending a display map that associates one or more data fields with a respective location within a display of a computing device; and sending one or more data items associated with one or more media items of the media service provider, where each sent data item corresponds to a respective at least one of the one or more data fields.

In yet another aspect, a computing system associated with a media service provider includes a processor and a computer-readable medium storing instructions that when executed by the processor cause the computing system to perform functions. The functions include sending a display map that associates one or more data fields with a respective location within a display of a computing device; and sending one or more data items associated with one or more media items of the media service provider, where each sent data item corresponds to a respective at least one of the one or more data fields.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A tangible, non-transitory computer-readable medium comprising program instructions that are executable by at least one processor such that a computing device is configured to perform functions comprising:
    causing display of a controller interface, the controller interface corresponding to a media playback system comprising one or more playback devices;
    receiving, via an input interface of the computing device within the displayed control interface, input data indicating a selection of a media item from a streaming audio service, wherein the selected media item is one of: (a) a container that includes a set of audio tracks or (b) a particular audio track within the set of audio tracks included in the container;
    sending, via a first network interface, a command to cause at least one playback device of the media playback system to play back the selected media item, wherein playing back the selected media item comprises the at least one playback device streaming, via a second network interface, data representing the selected media item from one or more servers of the streaming audio service;
    determining, via one or more processors of the computing device, that the streaming audio service has defined a non-default display map, the non-default display map defining (i) one or more first lines of data according to one or more data fields and (ii) one or more second lines of data comprising one or more strings, wherein a default display map defines one or more lines according to one or more additional data fields;
    causing display, within the controller interface, of first data items associated with the selected media item in the one or more first lines according to the one or more data fields; and
    causing display, within the controller interface, of the one or more strings in the one or more second lines.

2. The tangible, non-transitory computer-readable medium of claim 1, wherein causing display of the first data items associated with the selected media item in the one or more first lines according to the one or more data fields comprises:
    retrieving, via the first network interface from one or more servers of a cloud service, metadata of the selected media item that corresponds to the first data items; and
    causing display of the metadata of the selected media item in the one or more first lines according to the one or more data fields.

3. The tangible, non-transitory computer-readable medium of claim 2, wherein causing display of the metadata of the selected media item in the one or more first lines according to the one or more data fields comprises:
    causing display of a track title of the selected media item in a given first line of the one or more first lines in place of a given data field corresponding to track title.

4. The tangible, non-transitory computer-readable medium of claim 1, wherein causing display, within the controller interface, of the one or more strings in the one or more second lines comprises:
    retrieving, via the first network interface from a URL associated with the streaming audio service, data representing the one or more strings; and
    causing display of the one or more strings from the retrieved data in the one or more second lines.

5. The tangible, non-transitory computer-readable medium of claim 1, wherein at least one string of the one or more strings comprises one or more additional data fields, and wherein causing display of the one or more strings from the retrieved data in the one or more second lines comprises:
    retrieving, via the first network interface from one or more servers of a cloud service, additional metadata of the selected media item corresponding to second data items; and
    causing display of the additional metadata of the selected media item in the one or more second lines according to the one or more additional data fields.

6. The tangible, non-transitory computer-readable medium of claim 5, wherein causing display of the metadata of the selected media item in the one or more first lines according to the one or more data fields comprises:
    causing display of (i) an artist of the selected media item in a given second line of the one or more second lines in place of a first additional data field corresponding to artist and (ii) an album title of the selected media item in the given second line of the one or more second lines in place of a second additional data field corresponding to album title.

7. The tangible, non-transitory computer-readable medium of claim 1, wherein a given string of the one or more strings comprises a name of the streaming audio service, and wherein causing display of the one or more strings from the retrieved data in the one or more second lines comprises:
    causing display of the given string in a given second line of the one or more second lines.

8. The tangible, non-transitory computer-readable medium of claim 1, wherein the media item is a first media item and the streaming audio service is a first audio service, and wherein the functions further comprise:
    receiving, via the input interface of the computing device within the displayed control interface, input data indicating a selection of a second media item from a second streaming audio service, wherein the selected second media item is one of: (a) an additional container that includes an additional set of audio tracks or (b) an additional audio track within the set of additional audio tracks included in the additional container;
    sending, via the first network interface, a command to cause an additional playback device of the media playback system to play back the selected second media item;
    determining, via the one or more processors of the computing device, that the second streaming audio service has not defined a non-default display map; and
    causing display, within the controller interface, of data items associated with the selected second media item in the one or more lines according to the one or more additional data fields.

9. The tangible, non-transitory computer-readable medium of claim 1, wherein the at least one playback device comprises a first playback device and a second playback device, and wherein sending the command to cause at least one playback device of the media playback system to play back the selected media item comprises causing, via the first network interface, the first playback device and the second playback device to play back the selected media item in synchrony, wherein, during playback of the selected media item, the first playback device streams data representing the selected media item from one or more content servers associated with the streaming audio service and sends playback timing information to the second playback device.

10. A method to be performed by a computing device, the method comprising:
  causing display of a controller interface, the controller interface corresponding to a media playback system comprising one or more playback devices;
  receiving, via an input interface of the computing device within the displayed control interface, input data indicating a selection of a media item from a streaming audio service, wherein the selected media item is one of: (a) a container that includes a set of audio tracks or (b) a particular audio track within the set of audio tracks included in the container;
  sending, via a network interface, a command to cause at least one playback device of the media playback system to play back the selected media item, wherein playing back the selected media item comprises the at least one playback device streaming, via a second network interface, data representing the selected media item from one or more servers of the streaming audio service;
  determining, via one or more processors of the computing device, that the streaming audio service has defined a non-default display map, the non-default display map defining (i) one or more first lines of data according to one or more data fields and (ii) one or more second lines of data comprising one or more strings, wherein a default display map defines one or more lines according to one or more additional data fields;
  causing display, within the controller interface, of first data items associated with the selected media item in the one or more first lines according to the one or more data fields; and
  causing display, within the controller interface, of the one or more strings in the one or more second lines.

11. The method of claim 10, wherein causing display of the first data items associated with the selected media item in the one or more first lines according to the one or more data fields comprises:
  retrieving, via the network interface from one or more servers of a cloud service, metadata of the selected media item that corresponds to the first data items; and
  causing display of the metadata of the selected media item in the one or more first lines according to the one or more data fields.

12. The method of claim 11, wherein causing display of the metadata of the selected media item in the one or more first lines according to the one or more data fields comprises:
  causing display of a track title of the selected media item in a given first line of the one or more first lines in place of a given data field corresponding to track title.

13. The method of claim 10, wherein causing display, within the controller interface, of the one or more strings in the one or more second lines comprises:
  retrieving, via the network interface from a URL associated with the streaming audio service, data representing the one or more strings; and
  causing display of the one or more strings from the retrieved data in the one or more second lines.

14. The method of claim 10, wherein at least one string of the one or more strings comprises one or more additional data fields, and wherein causing display of the one or more strings from the retrieved data in the one or more second lines comprises:
  retrieving, via the network interface from one or more servers of a cloud service, additional metadata of the selected media item corresponding to second data items; and
  causing display of the additional metadata of the selected media item in the one or more second lines according to the one or more additional data fields.

15. The method of claim 14, wherein causing display of the metadata of the selected media item in the one or more first lines according to the one or more data fields comprises:
  causing display of (i) an artist of the selected media item in a given second line of the one or more second lines in place of a first additional data fields corresponding to artist and (ii) an album title of the selected media item in the given second line of the one or more second lines in place of a second additional data fields corresponding to album title.

16. The method of claim 10, wherein a given string of the one or more strings comprises a name of the streaming audio service, and wherein causing display of the one or more strings from the retrieved data in the one or more second lines comprises:
  causing display of the given string in a given second line of the one or more second lines.

17. The method of claim 10, wherein the at least one playback device comprises a first playback device and a second playback device, and wherein sending the command to cause at least one playback device of the media playback system to play back the selected media item comprises causing, via the network interface, the first playback device and the second playback device to play back the selected media item in synchrony, wherein, during playback of the selected media item, the first playback device streams data representing the selected media item from one or more content servers associated with the streaming audio service and sends playback timing information to the second playback device.

18. A media playback system comprising one or more playback devices and a computing device, the media playback system comprising:
  a network interface;
  at least one processor; and
  at least one non-transitory computer-readable medium comprising program instructions that are executable by the at least one processor such that the media playback system is configured to perform functions comprising:
  causing display of a controller interface corresponding to the media playback system;
  receiving, via an input interface of the computing device within the controller interface, input data indicating a selection of a media item from a streaming audio service, wherein the selected media item is one of: (a) a container that includes a set of audio tracks or (b) a particular audio track within the set of audio tracks included in the container;
  sending, via a first network interface, a command to cause at least one playback device of the media playback system to play back the selected media item, wherein playing back the selected media item comprises the at least one playback device streaming, via a second network interface, data representing the selected media item from one or more servers of the streaming audio service;

determining, via one or more processors of the computing device, that the streaming audio service has defined a non-default display map, the non-default display map defining (i) one or more first lines of data according to one or more data fields and (ii) one or more second lines of data comprising one or more strings, wherein a default display map defines one or more lines according to one or more additional data fields;

causing display, within the controller interface, of first data items associated with the selected media item in the one or more first lines according to the one or more data fields; and causing display, within the controller interface, of the one or more strings in the one or more second lines.

19. The media playback system of claim 18, wherein causing display of the first data items associated with the selected media item in the one or more first lines according to the one or more data fields comprises:

retrieving, via the network interface from one or more servers of a cloud service, metadata of the selected media item that corresponds to the first data items; and causing display of the metadata of the selected media item in the one or more first lines according to the one or more data fields.

20. The media playback system of claim 18, wherein causing display, within the controller interface, of the one or more strings in the one or more second lines comprises:

retrieving, via the network interface from a URL associated with the streaming audio service, data representing the one or more strings; and causing display of the one or more strings from the retrieved data in the one or more second lines.

\* \* \* \* \*

UNITED STATES PATENT AND TRADEMARK OFFICE
CERTIFICATE OF CORRECTION

| | | |
|---|---|---|
| PATENT NO. | : 11,372,656 B2 | |
| APPLICATION NO. | : 17/135299 | |
| DATED | : June 28, 2022 | |
| INVENTOR(S) | : Keith Corbin | |

It is certified that error appears in the above-identified patent and that said Letters Patent is hereby corrected as shown below:

On the Title Page

Item (74), in Column 2, in "Attorney, Agent, or Firm", Line 1, delete "Fortern" and insert -- Fortem --, therefor.

Signed and Sealed this
Twenty-third Day of August, 2022

*Katherine Kelly Vidal*

Katherine Kelly Vidal
*Director of the United States Patent and Trademark Office*